United States Patent
Watanabe et al.

(10) Patent No.: US 7,193,639 B2
(45) Date of Patent: Mar. 20, 2007

(54) IMAGE FORMING APPARATUS

(75) Inventors: Yoshikazu Watanabe, Toyohashi (JP);
Takatoshi Hamada, Toyokawa (JP);
Makoto Obayashi, Toyokawa (JP);
Syuji Maruta, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 287 days.

(21) Appl. No.: 11/017,687

(22) Filed: Dec. 22, 2004

(65) Prior Publication Data
US 2005/0179762 A1 Aug. 18, 2005

(30) Foreign Application Priority Data
Feb. 18, 2004 (JP) ............... 2004-041623

(51) Int. Cl.
G03G 15/01 (2006.01)
G03G 15/04 (2006.01)
G03G 13/01 (2006.01)
G03G 13/04 (2006.01)
B41J 2/435 (2006.01)

(52) U.S. Cl. .................................. 347/118
(58) Field of Classification Search ........ 347/115–118, 347/231, 243, 259, 260; 399/299
See application file for complete search history.

(56) References Cited

U.S. PATENT DOCUMENTS 6,204,867 B1   3/2001   Fujimoto et al.
6,570,598 B1 *   5/2003   Ream et al. ............ 347/116

FOREIGN PATENT DOCUMENTS

JP   11-052659   2/1999
JP   11-065211   3/1999

* cited by examiner

Primary Examiner—Huan Tran
(74) Attorney, Agent, or Firm—Buchanan Ingersoll & Rooney PC

(57) ABSTRACT

The present invention provides a tandem-style image forming apparatus that has multiple image forming units and a controller that controls the rotation of the polygon mirrors of the image forming units, wherein during image formation, the controller performs steady rotation control for the polygon mirrors of the image forming units used for image formation, and where a color image forming session is performed after a monochrome image formation session is completed, the controller performs steady rotation control for polygon mirrors of the image forming units used for color image formation but not for monochrome image formation a prescribed period of time prior to the commencement of image formation by such image forming units, thereby extending the useful lives of the motors that drive the polygon mirrors and producing high-quality color images.

17 Claims, 7 Drawing Sheets

IMAGE FORMING APPARATUS

CROSS-REFERENCE TO RELATED APPLICATIONS

This application is based on application(s) No. 2004-41623, filed in Japan on the content of which are hereby incorporated by reference.

BACKGROUND OF THE INVENTION

1. Field of the Invention

The present invention relates to a tandem-style color image forming apparatus, and more particularly, to an image forming apparatus that forms a color image using multiple optical scanning devices.

2. Description of the Related Art

Tandem-style color image forming apparatuses that have multiple optical scanning devices and form images of various colors using these optical scanning devices are now in general use. For example, one type of commonly used image forming apparatus has photoreceptor units corresponding to cyan (C), magenta (M), yellow (Y) and black (K), each of which includes a corresponding laser device, and forms a color image by transferring onto paper or onto an intermediate transfer unit images of the various colors superimposed on top of one another.

In an image forming apparatus of this type, because the speed of rotation of the incorporated polygon mirrors has increased with the increase in the image forming speed of the apparatus, the amount of power consumption is substantial. In order to conserve energy, extend the useful lives of the motors that drive the polygon mirrors (hereinafter the 'polygon motors') and reduce the noise caused by the whirring of the polygon mirrors, when the apparatus is in the standby state in which it is not engaged in image formation, the polygon motors are stopped or slowed down. Furthermore, image forming apparatuses have been proposed in which only the polygon motors that are needed are driven in accordance with the colors needed for image formation (see Patent Documents 1 and 2, for example).

Patent Document 1: Japanese Laid-Open Patent No. H11-52659

Patent Document 2: Japanese Laid-Open Patent No. H11-65211

However, while image forming apparatuses of the conventional art described above are designed so as to reduce the period during which the polygon motors are driven, the useful life of a polygon motor is also affected by the number of times it is driven. In other words, the problem exists that repeatedly starting and stopping a polygon motor depending on whether it is needed for image formation increases the number of times it is driven. In addition, because it takes some time for a polygon motor to reach a steady rate of rotation after the driving thereof is begun, driving must take into consideration such warmup period. If image formation is begun before a stable rate of rotation is reached, deterioration in image quality such as color shift may result.

OBJECT AND SUMMARY

The present invention was devised in order to resolve the problems inherent in the conventional image forming apparatus described above. An object of the present invention is to provide an image forming apparatus that extends the useful lives of the motors that drive the polygon mirrors, taking into consideration the rotation duration and the number of driving sessions for each polygon mirror, and that produces high-quality color images.

In order to attain the object described above, the image forming apparatus of the present invention is an image forming apparatus that has multiple image forming units, each of which includes a polygon mirror that reflects the writing light such that the light scans the photoreceptor surface, and that is capable of performing monochrome image formation using one image forming unit and color image formation using multiple image forming units, such apparatus further including a rotation controller that controls the rotation of the polygon mirrors of the image forming units, wherein during an image formation session, the rotation controller carries out steady rotation control for the polygon mirrors of the image forming units used for image formation, and where a color image formation session is performed after a monochrome image formation session is completed, the rotation controller begins steady rotation control for the polygon mirrors of the image forming units used for color image formation but not for monochrome image formation at least a prescribed period of time prior to the commencement of image formation by such image forming units.

According to the image forming apparatus of the present invention, the rotation of the polygon mirrors is controlled by a rotation controller and steady rotation control is carried out for the polygon mirrors of the image forming units necessary for monochrome image formation and color image formation, respectively. During a monochrome image formation session, of [the polygon mirrors for] the image forming units used for color image formation, the polygon mirrors not used for monochrome image formation need not be rotating steadily. When a color image formation session is performed following the completion of a monochrome image formation session, steady rotation control is begun for these polygon mirrors by the rotation controller at least a prescribed period of time prior to the commencement of image formation. If such prescribed period of time is set to be at least as long as the time needed for each polygon mirror to actually reach steady rotation after the rotation controller begins steady rotation control for the polygon mirror, these polygon mirrors should be rotating at a steady rate when color image formation begins. As a result, an image forming apparatus can be provided that extends the useful lives of the motors that drive the polygon mirrors and produces high-quality color images.

Furthermore, it is preferred in the present invention that (1) the image forming apparatus also have color determination means that determines based on the image data provided for image formation, at least a prescribed period of time prior to the commencement of writing based on the image data, whether or not the image data is color image data, and where the determination result from the color determination means changes from NO to YES, the rotation controller begins steady rotation control for the polygon mirrors of the image forming units used for color image formation but not for monochrome image formation.

In this way, the image data can be determined to be color image data by the color determination means at least a prescribed period of time prior to the commencement of color image formation. Where the determination result from the color determination means changes from NO to YES, because steady rotation control is carried out by the rotation controller for the polygon mirrors of the image forming units used for color image formation but not for monochrome image formation, when color image formation is begun, the polygon mirrors of the image forming units used for color image formation are rotating at a steady rate. Here, the determination by the color determination means regarding color image data may be performed for each page or for each line.

The image forming apparatus of the present invention may be an image forming apparatus that has multiple image forming units, each of which includes a polygon mirror that reflects the writing light such that the light scans the photoreceptor surface, and that is capable of performing monochrome image formation using one image forming unit and color image formation using multiple image forming units, such apparatus further including a rotation controller that controls the rotation of the polygon mirrors of the image forming units, wherein during an image formation session, the rotation controller carries out steady rotation control for the polygon mirrors of the image forming units used for image formation, and where a monochrome image formation session is performed after a first color image formation session is completed and a second color image formation session is then performed after the monochrome image formation session is completed, if the interval between the completion of the first color image formation session and the commencement of the second color image formation session does not exceed a prescribed period of time, the rotation controller continues steady rotation control for the polygon mirrors of all image forming units used for color image formation during the monochrome image formation session, while if the interval between the completion of the first color image formation session and the commencement of the second color image formation session does exceed the prescribed period of time, the rotation controller slows down or stops the polygon mirrors of the image forming units not used for monochrome image formation after the completion of the first color image formation session, and begins steady rotation control for these polygon mirrors once more at least a prescribed period of time before the commencement of the second color image formation session.

According to this image forming apparatus, the rotation of the polygon mirrors is controlled depending on whether or not the interval between the completion of the first color image formation session and the second color image formation session exceeds a prescribed period of time. Because the rotation of the polygon mirrors of the image forming units not used for monochrome image formation is slowed down or stopped only if such interval exceeds the prescribed period of time, an image forming apparatus can be provided that extends the useful lives of the polygon motors that drive the polygon mirrors and produces high-quality color images.

The image forming apparatus of the present invention may be an image forming apparatus that has multiple image forming units, each of which includes a polygon mirror that reflects the writing light such that the light scans the photoreceptor surface, and that is capable of performing monochrome image formation using one image forming unit and color image formation using multiple image forming units, such apparatus further including a rotation controller that controls the rotation of the polygon mirrors of the image forming units, as well as a rotation history storage unit that stores rotation history information regarding the polygon mirrors of the image forming units used for color image formation but not for monochrome image formation, wherein during an image formation session, the rotation controller carries out steady rotation control for the polygon mirrors of the image forming units used for image formation, and where a monochrome image formation session is performed after a first color image formation session is completed and a second color image formation session is then performed after the completion of the monochrome image formation session, if the interval between the completion of the first color image formation session and the commencement of the second color image formation session does not exceed a prescribed period of time, the rotation controller continues steady rotation control for the polygon mirrors of all image forming units used for color image formation during the monochrome image formation session, while if the interval between the completion of the first color image formation session and the commencement of the second color image formation session does exceed the prescribed period of time, the rotation controller determines, based on the rotation history information stored in the rotation history storage unit, whether or not to slow down or stop the rotation of the polygon mirrors of the image forming units not used for monochrome image formation after the completion of the first color image formation session.

According to this image forming apparatus, where the interval between the completion of the first color image formation session and the commencement of the second color image formation session exceeds a prescribed period of time, the rotation of the polygon mirrors is controlled taking into consideration the rotation history information stored in the rotation history storage unit. If the rotation duration and the number of driving sessions are stored for each polygon mirror, for example, as rotation history information, the useful lives of the polygon motors that drive the polygon mirrors can be extended taking such information into consideration.

Furthermore, it is preferred in the present invention that the rotation history storage unit store the cumulative number of times that each of the target polygon mirrors was driven in the past, and where the interval between the completion of the first color image formation session and the commencement of the second color image formation session exceeds a prescribed period of time, if any of the cumulative numbers of polygon mirror driving sessions stored in the rotation history storage unit exceeds a prescribed number, the rotation controller continues steady rotation control for the target polygon mirrors during monochrome image formation, and if the cumulative numbers of polygon mirror driving sessions stored in the rotation history storage unit do not exceed the prescribed number, the rotation controller slows down or stops the rotation of the target polygon mirrors, and resumes steady rotation control for such polygon mirrors a prescribed period of time prior to the commencement of the second color image formation session.

In this way, the cumulative number of times that each polygon mirror has been driven can be taken into consideration.

Furthermore, it is preferred in the present invention that the rotation history storage unit store the cumulative rotation duration for each of the target polygon mirrors, and where the interval between the completion of the first color image formation session and the commencement of the second color image formation session exceeds a prescribed period of time, if the cumulative rotation durations stored in the rotation history storage unit do not exceed a prescribed threshold value, the rotation controller continues steady rotation control for the target polygon mirrors during the monochrome image formation session, while if any of the cumulative rotation durations stored in the rotation history storage unit does exceed the prescribed threshold value, the rotation controller slows down or stops the target polygon mirrors, and resumes steady rotation control for such polygon mirrors a prescribed period of time prior to the commencement of the second color image formation session.

In this way, the cumulative rotation duration for each polygon mirror can be taken into consideration.

According to the image forming apparatus of the present invention, the useful lives of the motors that drive the polygon mirrors can be extended and high-quality color images can be obtained while taking into consideration the rotation duration of each of the polygon mirrors and the number of times each polygon mirror was driven.

These and other objects, advantages and features of the present invention will become apparent from the following description taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

The best embodiment of the present invention is described in detail below with reference to the attached drawings. This embodiment comprises a tandem-style color printer in which the present invention is applied.

Figure 1:
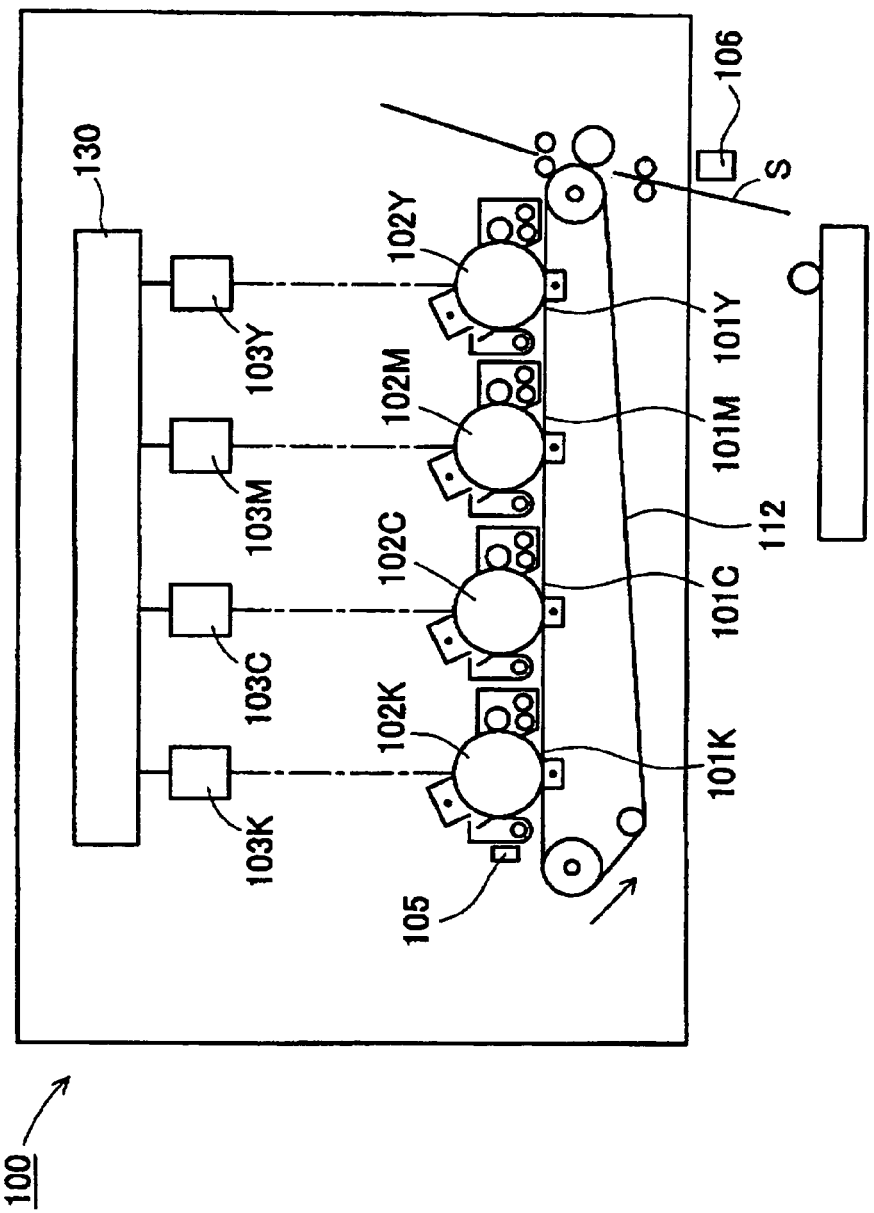
FIG. 1 is a drawing schematically showing the construction of the components of a color printer of an embodiment of the present invention.

The color printer 100 of this embodiment includes image forming units 101Y, 101M, 101C, 101K of various colors disposed parallel to one another in this sequence, as shown in FIG. 1. Each of the image forming units 101Y, 101M, 101C, 101K has a photoreceptor drum 102Y, 102M, 102C, 102K, a laser recording unit 103Y, 103M, 103C, 103K and other peripheral devices (including a charger, a developing device, a transfer device and a cleaner). The color printer 100 also includes a resist sensor 105, a TOD sensor 106, a transfer belt 112 and a controller 130.

The image forming units 101Y, 101M, 101C, 101K form images on the transfer belt 112. The laser recording units 103Y, 103M, 103C, 103K irradiate the photosensitive layers of the photoreceptor drums 102Y, 102M, 102C, 102K with light and write electrostatic latent images thereon. The resist sensor 105 detects the images used for correction (the resist patterns) formed on the transfer belt 112. The TOD sensor 106 detects the transfer medium S conveyed thereto. The controller 130 performs control of the various components of the color printer 100.

In order for this color printer 100 to form a color image, electrostatic latent images are first written on the photosensitive layers of the photoreceptor drums 102Y, 102M, 102C, 102K in the image forming units 101Y, 101M, 101C, 101K, and these latent images are developed into toner images.

These toner images of the various colors are then sequentially transferred to the same location on the transfer belt 112 in a superimposed fashion. By transferring the superimposed toner images onto the transfer medium S, a color image is formed. In order to superimpose the toner images of the various color on top of each other without color shift, resist correction is performed. In other words, during times other than image formation, resist patterns are formed by the image forming units 101Y, 101M, 101C, 101K and are detected by the resist sensor 105. Setting values for resist correction, such as the main scanning position, secondary scanning position and main scanning magnification, are calculated based on the detection timing for the resist pattern of each color.

Figure 2:
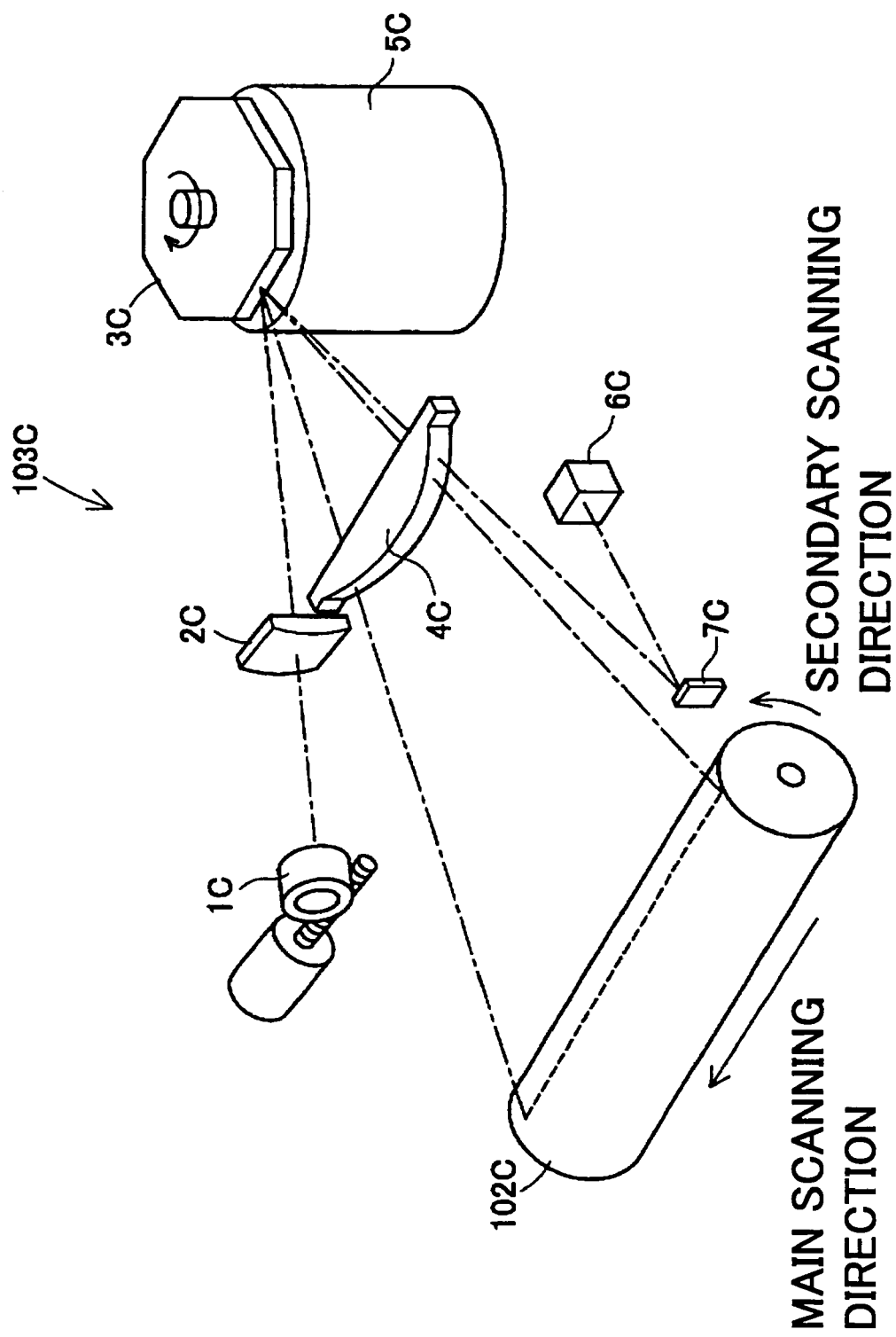
FIG. 2 is a drawing showing in a schematic fashion the construction of the components of the laser recording unit.

The laser recording units 103Y, 103M, 103C, 103K of the various colors will now be explained with reference to FIG. 2. Because the laser recording units 103Y, 103M, 103C, 103K have an identical construction, the laser recording unit 103C will be explained here as an example. The laser recording unit 103C includes a laser device 1C, a collimator lens 2C, a polygon mirror 3C, an fθ lens 4C and a polygon motor 5C, as shown in FIG. 2. FIG. 2 also shows, in addition to the laser recording unit 103C, the photoreceptor 102C toward which the laser beam is emitted, an SOS sensor 6C that detects the timing for the commencement of scanning, and a reflecting mirror 7C that is disposed near the edge of the scan area of the photoreceptor 102C.

Using this laser recording unit 103C, the divergent light emitted from the laser device 1C is formed into a parallel beam by the collimator lens 2C and strikes the polygon mirror 3C. The laser beam deflected by the polygon mirror 3C scans the photoreceptor drum 102C via the fθ lens 4C. When this happens, the polygon mirror 3C is rotated at a high speed by the polygon motor 5C, and the photoreceptor drum 102C is driven to rotate synchronously with the scanning by the laser beam. The laser beam deflected by the polygon mirror 3C is reflected by the reflecting mirror 7C immediately before it strikes the photoreceptor 102C, and is then led to the SOS sensor 6C. The timing at which the laser beam is received is detected by the SOS sensor 6C, and a synchronization signal is generated based on this timing.

Figure 3:
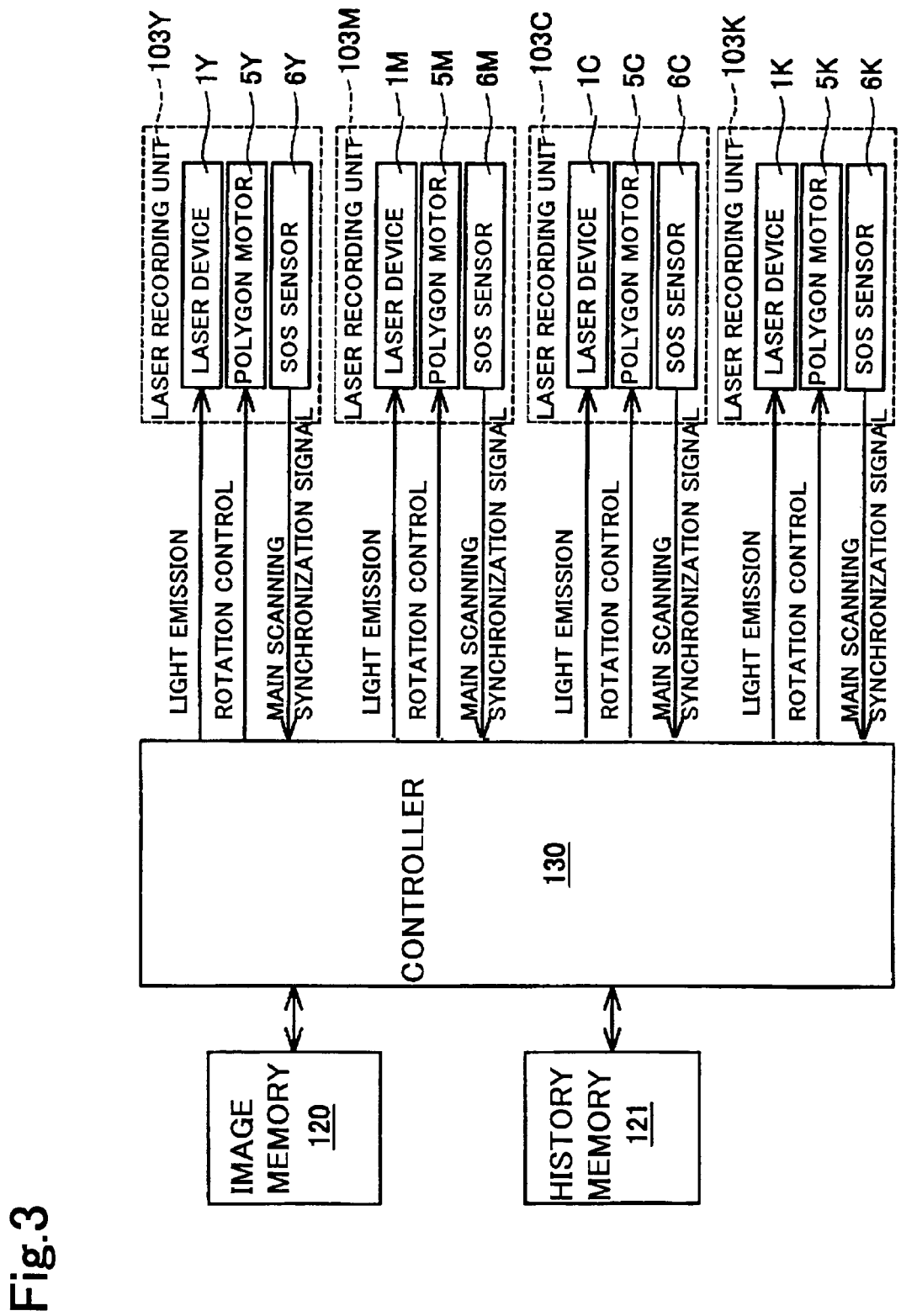
FIG. 3 is a block diagram showing in a schematic fashion the construction of the controller.

The controller 130 of this color printer 100 will now be explained. The controller 130 receives image data from the image memory 120, and controls the laser recording units 103Y, 103M, 103C, 103K of the various colors based on the image data, as shown in FIG. 3, which shows in a schematic fashion the construction of the controller 130. During image formation, the controller 130 sends rotation control signals to the polygon motors 5Y, 5M, 5C, 5K of the various colors to control their respective rotation. It also sends light emission control signals to the laser devices 1Y, 1M, 1C, 1K of the various colors to cause them to emit light at prescribed times. The controller 130 receives synchronization signals from the SOS sensors 6Y, 6M, 6C, 6K of the various colors, and performs color matching such as resist correction based on these signals. Furthermore, a history memory 121 connected to the controller 130 stores the drive history data for the laser recording units 103Y, 103M, 103C, 103K of the various colors.

In this color printer 100, in connection with the control of the polygon motors 5Y, 5M, 5C, 5K, the cumulative number of times that each of them was driven and the cumulative rotation duration for each motor since the time of manufacture are taken into consideration. Accordingly, the cumulative numbers of driving sessions nY, nM, nC, nK and the cumulative rotation durations tY, tM, tC, tK for the polygon motors 5Y, 5M, 5C, 5K are stored in the history memory 121 as drive history data, and are updated in accordance with the drive state [of the polygon motors]. These values may vary from color to color. In particular, the values for the three colors of YMC and the value for K are generally different.

In the laser recording units 103Y, 103M, 103C, 103K of the various colors, in order to reduce motor wear, noise and the like, it is preferred that the polygon motors 5Y, 5M, 5C, 5K be stopped or slowed down when they are not needed for image formation. For example, because the polygon motors 5Y, 5M, 5C for the three colors of YMC are not used for image formation during monochrome printing, they may be stopped. In this color printer 100, whether or not the polygon motors 5Y, 5M, 5C for the three colors of YMC should be stopped or slowed down during monochrome printing is determined with reference to the printing schedule and the drive history data, for example.

The polygon motors 5Y, 5M, 5C, 5K require a warmup time ts after they are started and before they reach steady rotation that enables printing. Therefore, in order to perform color printing, driving of the polygon motors 5Y, 5M, 5C, 5K must begin at least the warmup time ts prior to the commencement of printing. Therefore, when the interval between the completion of a color printing session and the commencement of the next color printing session is expected to be longer than the warmup time ts, the polygon motors 5Y, 5M, 5C for the three colors of YMC may be stopped or slowed down. However, if such interval is expected to not exceed the warmup time ts, the rotation of the polygon motors 5Y, 5M, 5c is maintained in order to prevent a reduction in the printing speed.

Accordingly, in order to determine the timing for the startup, stoppage or speed reduction for the polygon motors 5Y, 5M, 5C, when monochrome printing is performed, it is determined whether or not the duration of the monochrome printing session will exceed the warmup time ts. In general, where monochrome printing is to be performed for one or more pages, it can be determined that such printing will require more time than the warmup time ts. Even in the case of color page printing, the page does not necessarily consist solely of color images. Because areas of the page not occupied by color images are monochrome image areas, it is determined whether or not printing of these monochrome image areas will take longer than the warmup time ts. In order to carry out this determination, the image data on which determination as to color areas is based (a 'color area determination image') is received a prescribed period of time before the commencement of printing, and the color image areas in the color page are determined prior to image formation. Here, the prescribed period of time is set to be equal to or longer than the warmup time ts.

This color area determination image data is identical to the image data for the color page, and is sent from the image memory 120 for the determination of color areas. When a color image area is found in the color area determination image data, the controller 130 carries out steady rotation control for the polygon motors 5Y, 5M, 5C, 5K. Because this operation is begun a prescribed period of time, i.e., at least the warmup time ts, prior to the commencement of image formation of the subject color image area, the polygon motors are rotating at a steady rate when color image formation begins. Where the time required for the image formation for one page is not sufficiently longer than the warmup time ts, the determination regarding whether color printing or monochrome printing is to be performed may be made for each page.

In addition, this color printer 100 performs rotation control in the following manner using the drive history data. Where the highest cumulative number of driving sessions nY, nM, nC (nmax) exceeds a prescribed cumulative number of driving sessions (n), the motors are no longer stopped often because each stoppage increases the number of driving sessions value. Where the highest of the cumulative rotation durations tY, tM, tC (tmax) exceeds a prescribed rotation time t, the motors are controlled to stop as much as possible so as not to increase the value of rotation duration.

Figure 4:
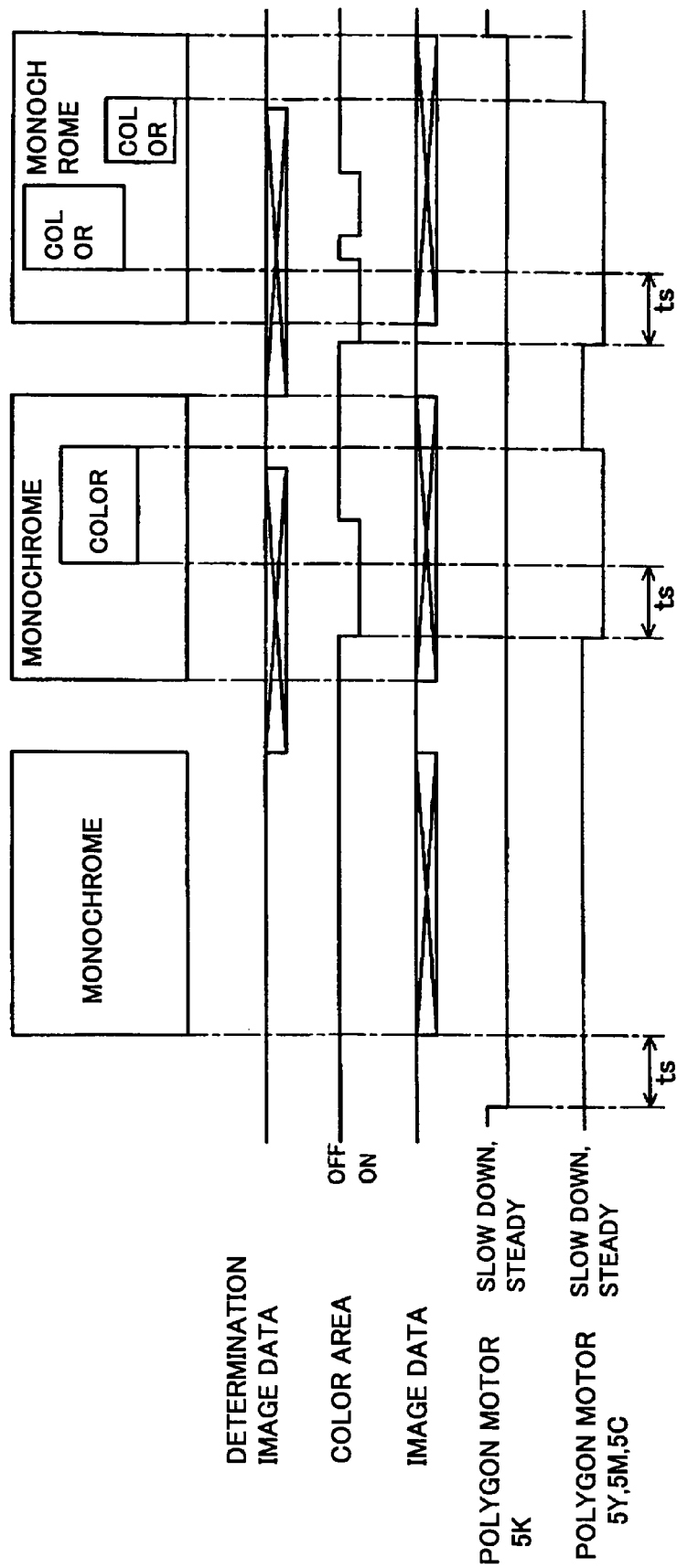
FIG. 4 is a time chart showing the control timing of the controller.

An example of the timing for each control routine executed by the controller 130 is shown in FIG. 4. FIG. 4 shows a job to print three pages. The first page requires monochrome printing and the second and third pages require color printing. Because color area determination is not required for the monochrome printing page, no determination data is received in connection with the first page. Driving of the polygon motor 5K is begun the warmup time ts before the image data is received and printing is begun.

Because the next page is a color page, color area determination is first performed. In order to perform this operation, the controller 130 receives color area determination image data prior to the commencement of printing by approximately the warmup time ts. When the color area determination result based on this data changes from OFF to ON, driving of the polygon motors 5Y, 5M, 5C is begun simultaneously for the three colors of YMC. This driving is initiated the warmup time ts prior to the commencement of printing of the color area, and as a result, these polygon motors are rotating at a steady rate by the time printing of the color area commences. Because the color area determination is OFF when printing of the color area is completed, it is seen that the time prior to the printing of the next color area is longer than the warmup time ts. Therefore, the polygon motors 5Y, 5M, 5C for the three colors of YMC are slowed down. By slowing them down, the wear thereon can be reduced without increasing the number of driving sessions value.

Where the interval between color areas is short, as in connection with the third page, the polygon motors 5Y, 5M, 5C for the three colors of YMC are not slowed down but are maintained at a steady rate of rotation. Because the color area determination result becomes ON for the next color area before the printing of the first color area is finished, the interval between the two color printing sessions can be determined to be shorter than the warmup time ts. As a result, the rotation of the polygon motors 5Y, 5M, 5C is stable when the next color area printing session begins, and a high-quality color image can be obtained. Where printing for the entire job received is finished and no next job has been received, all polygon motors 5Y, 5M, 5C, 5K are stopped.

Figure 5:
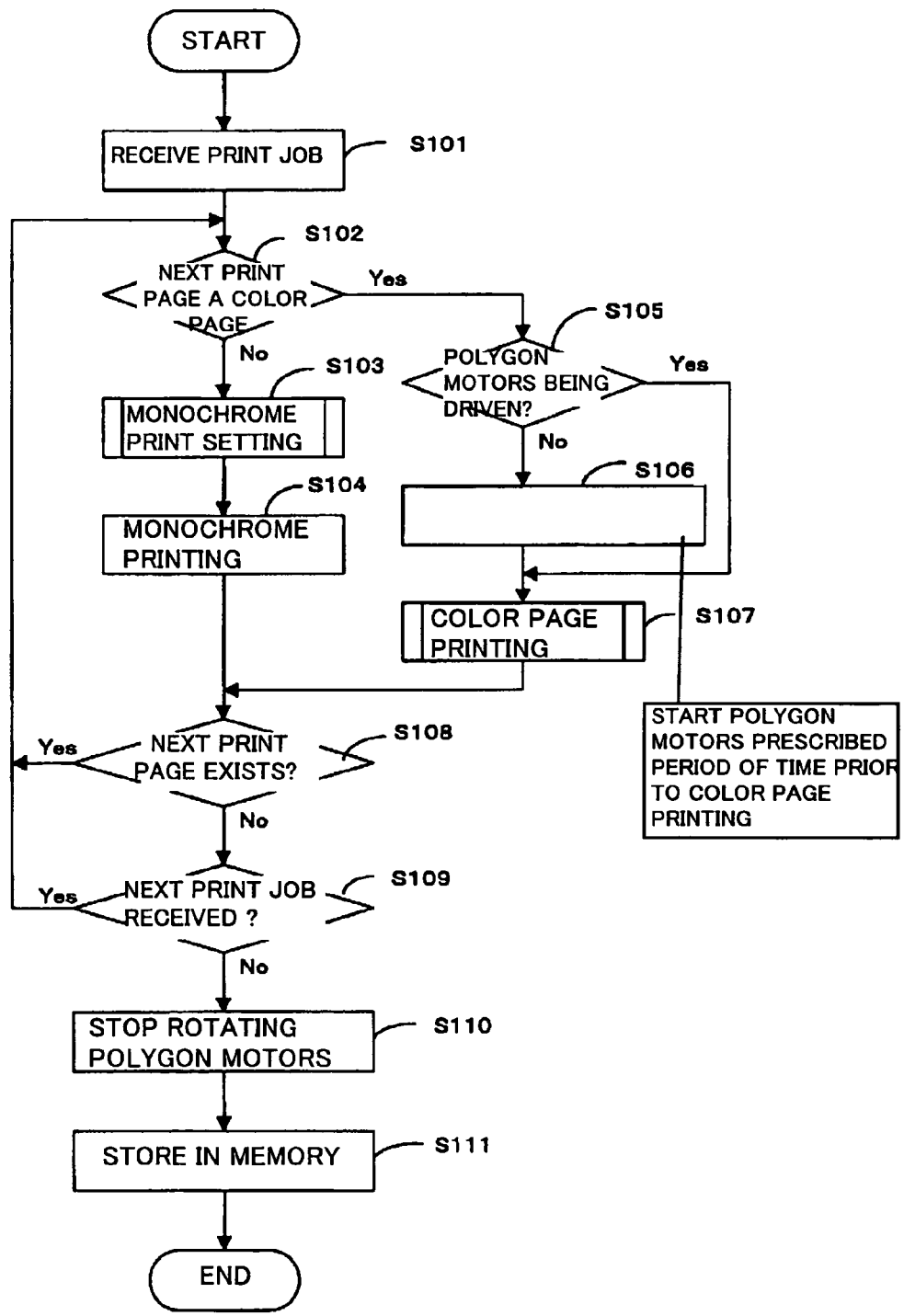
FIG. 5 is a flow chart showing a printing routine.

The printing routine carried out by this color printer 100 will now be explained with reference to the flow charts of FIGS. 5–7. When power is turned ON, the color printer 100 initializes various components, and stands by until a print job is received or various settings are input. When a print job is received, the printing routine shown in FIG. 5 is executed.

When a print job is received (S101), it is first determined whether the first print page of that job is a color page or a monochrome page (S102). If the first page is a monochrome page that does not include any color printing areas (NO in S102), the monochrome printing setting routine shown in FIG. 6 is executed (S103). This routine is described below. When the monochrome print setting routine is finished, a monochrome page is printed (S104).

If the first page is a color page that includes color printing areas (YES in S102), it is determined whether or not the polygon motors are being driven (S105). If they are not (NO in S105), driving of the polygon motors 5Y, 5M, 5C, 5K is begun the time ts prior to the commencement of printing of the color page, taking into consideration the warmup time ts for the polygon motors 5Y, 5M, 5C, 5K (S106). When the rates of rotation of the polygon motors 5Y, 5M, 5C, 5K are stabilized, the color page printing routine shown in FIG. 7 is executed (S107). This routine is described below.

When printing of the monochrome page or color page is finished, it is determined whether or not there is a next page to print (S108). Where there is a next page to be printed (YES in S108), the operations of S102-S107 are performed in the same manner for the next page. Alternatively, where printing for the entire job is finished (NO in S108), the printer enters the standby state until a next print job is received. When a next print job is received within a prescribed period of time (YES in S109), the operations of S102–S108 are performed in the same manner for that job. Where no print job is received within the prescribed period of time (NO in S109), all rotating polygon motors 5Y, 5M, 5C, 5K are stopped (S110). Additions are made to the cumulative number of driving sessions and the cumulative rotation duration for each polygon motor 5Y, 5M, 5C, 5K that was driven or for which steady rotation control was performed during the current session, and the results are stored in the history memory 121 (S111), whereupon the routine is ended and the printer stands by until a next job is received.

The monochrome print setting routine will now be explained with reference to FIG. 6. This routine is executed before monochrome printing to perform steady rotation control for the polygon motor 5K and to determine whether or not to slow down the other polygon motors 5Y, 5M, 5C. When this routine is executed, it is first determined whether or not steady rotation control is being performed for the polygon motors 5Y, 5M, 5C (S201). If steady rotation control is not being performed for these polygon motors and they are slowing down or have been stopped (NO in S201), nothing further is done.

If the polygon motors 5Y, 5M, 5C is under steady rotation control (YES in S201), the time needed for the monochrome printing to be performed is estimated, and it is determined whether or not the estimated monochrome printing time exceeds a prescribed value (S202). For example, where the estimated monochrome printing time is shorter than the warmup time ts needed for the polygon motors to reach steady rotation (NO in S202), the polygon motors 5Y, 5M, 5C are maintained under steady rotation control.

Where the monochrome printing time exceeds the prescribed value (YES in S202), it is determined whether the highest of the cumulative numbers of driving sessions nmax for the polygon motors 5Y, 5M, 5C is smaller than a prescribed cumulative number of driving sessions (n) (S203). If nmax is smaller than (n) (YES in S203), the polygon motors 5Y, 5M, 5C are slowed down (S205). Where nmax equals or exceeds (n) (No in S203), it is determined whether or not the highest of the cumulative rotation time values tmax for the polygon motors 5Y, 5M, 5C exceeds a prescribed cumulative rotation time (t) (S204). Where tmax is longer than (t) (YES in S204), speed reduction is selected even if the highest number of driving sessions is higher than the prescribed cumulative number of driving sessions (S205). Where tmax equals or is shorter than (t) (NO in S204), the polygon motors are not slowed down.

It is further determined whether or not the black polygon motor 5K is under steady rotation control (S206), and if it is not (NO in S206), steady rotation control is begun (S207). Preparations for monochrome printing are thereby completed, whereupon this routine is ended. The color page printing routine will now be explained with reference to FIG. 7. This routine is executed when a page that includes color areas is printed. When this routine is begun, the controller 130 receives color image area determination image data from the image memory 120 (S301). From this image data, it is determined whether or not the next printing area is a color image area (S302). If the next printing area is determined to be a color image area (YES in S302), it is determined whether or not the polygon motors 5Y, 5M, 5C are under steady rotation control (S303). If they are not (NO in S303), steady rotation control is begun (S304).

When the three color polygon motors 5Y, 5M, 5C reach steady rotation, printing of the color image area is begun (S305). Because the color image area determination is carried out the warmup time ts prior to image formation, the three color polygon motors 5Y, 5M, 5C reach steady rotation simultaneously with or prior to the commencement of image formation for this area. Color printing is performed until all of the color image area is printed (YES in S306). When printing of the color area is completed, it is determined whether or not such printing completes the printing for the page (S310). If such printing does not finish the page (NO in S310), S302 is repeated and it is determined whether or not the next printing area is a color area.

Figure 6:
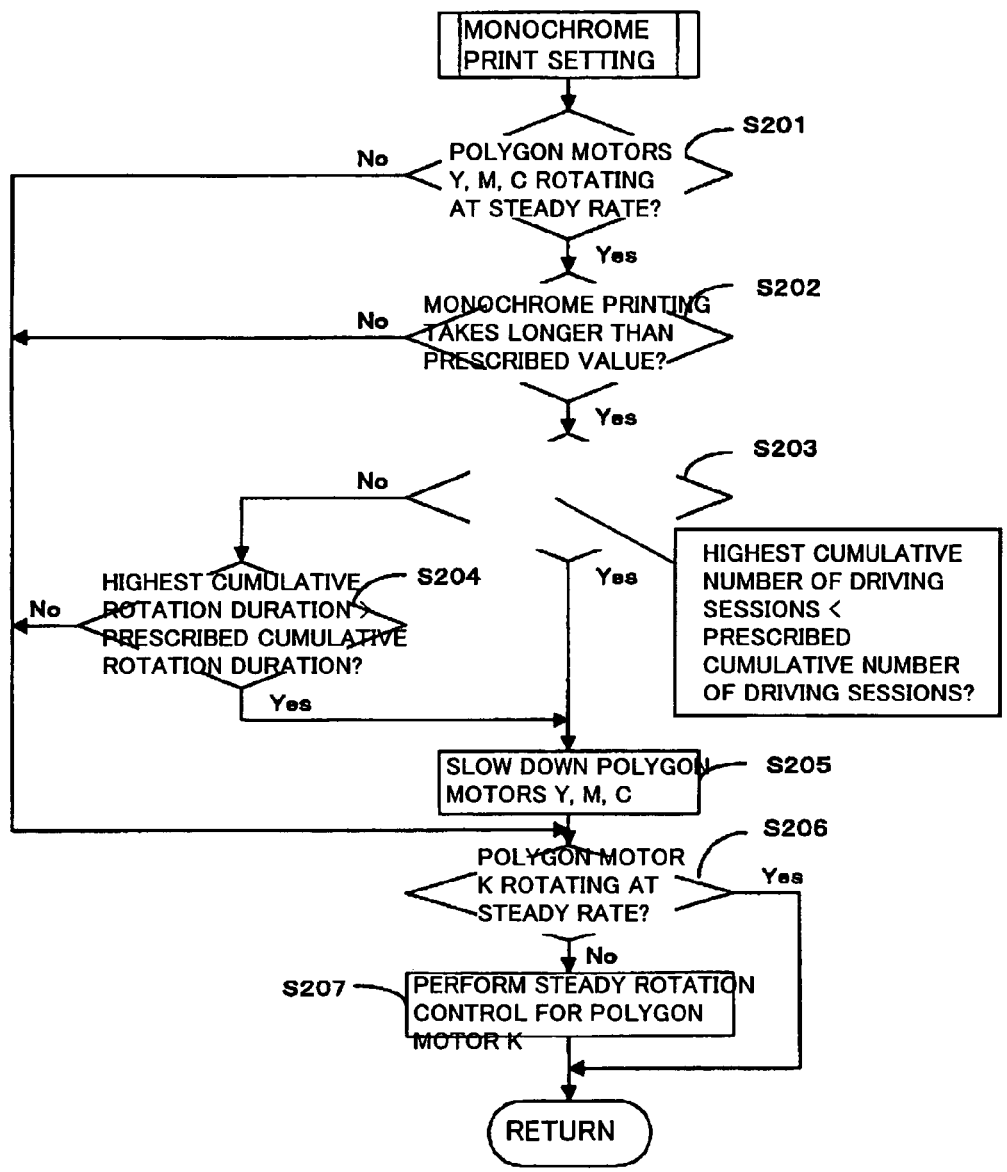
FIG. 6 is a flow chart showing a monochrome printing setting routine.
Figure 7:
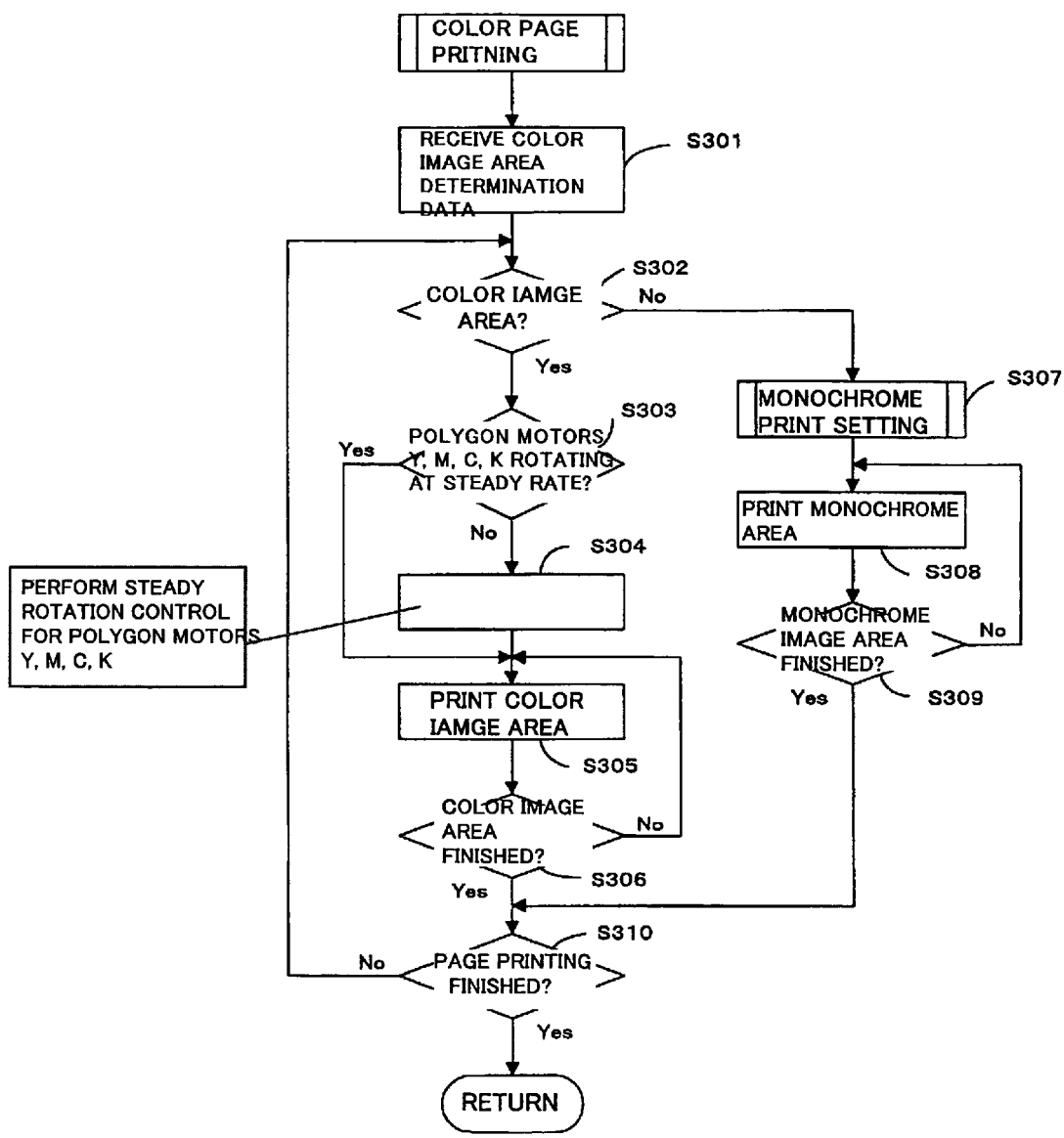
FIG. 7 is a flow chart showing a color page printing routine.

If the next printing area is not a color area (NO in S302), the monochrome printing routine shown in FIG. 6 is executed (S307). The state of rotation for the three color polygon motors 5Y, 5M, 5C is set, and printing for the monochrome area is performed (S308). Monochrome printing is performed until all of the monochrome image area is printed (YES in S309), and it is determined whether or not printing of the page is completed (S310). If printing is not completed (NO in S310), S302 is repeated and it is determined whether or not the next printing area is a color area. When printing for the entire page is finished (YES in S310), this routine is ended.

As described in detail above, according to the color printer 100 of the present invention, where monochrome printing continues for at least a prescribed period of time, the three color polygon motors 5Y, 5M, 5C for color printing are slowed down to prevent the wear thereof. Furthermore, the cumulative numbers of driving sessions and the cumulative rotation durations for the polygon motors 5Y, 5M, 5C, 5K since the manufacture thereof are calculated and stored in memory. They are compared with prescribed values, respectively, to determine the state of driving of the polygon motors 5Y, 5M, 5C, 5K. Moreover, during color page printing, because color image area determination data is received beforehand to determine color areas, the polygon motors 5Y, 5M, 5C for color printing can be rotating at a steady rate when printing of a color area is begun. As a result, an image forming apparatus is provided that extends the useful lives of the polygon motors that drive the polygon mirrors and produces high-quality color images while taking into consideration the rotation duration and the number of driving sessions for each polygon mirror.

This embodiment is merely an example, and does not limit the present invention in any way whatsoever. Therefore, the present invention can be naturally improved and modified within its essential scope.

For example, it is acceptable if the standby period during which the printer waits for a next job with the polygon motors continuously rotating is made longer when the highest cumulative number of driving sessions nmax exceeds a prescribed value.

In addition, the present invention is applied in a color printer 100 in this embodiment, but the implementation of the present invention is not limited thereto. In other words, the present invention can be applied in a copying machine, a facsimile machine or the like so long as the apparatus comprises an electrophotographic image forming apparatus. Furthermore, the present invention can be applied in any image forming apparatus that forms images using multiple light beams for which separate optical systems exist.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus that has multiple image forming units, each of which includes a polygon mirror that reflects the writing light such that the light scans the photoreceptor surface, and that is capable of performing monochrome image formation using one image forming unit and color image formation using multiple image forming units, comprising:
    a rotation controller that controls the rotation of the polygon mirrors of the image forming units,
    wherein during an image formation session, the rotation controller carries out steady rotation control for the polygon mirrors of the image forming units used for image formation, and
    where a color image formation session is performed after a monochrome image formation session is completed, the rotation controller begins steady rotation control for the polygon mirrors of the image forming units used for color image formation but not for monochrome image formation at least a prescribed period of time prior to the commencement of image formation by such image forming units.

2. The image forming apparatus according to claim 1, wherein said apparatus further includes color determination means that determines based on the image data provided for image formation, at least a prescribed period of time prior to the commencement of writing based on the image data, whether or not the image data is color image data, and where the determination result from the color determination means changes from NO to YES, the rotation controller begins steady rotation control for the polygon mirrors of the image forming units used for color image formation but not for monochrome image formation.

3. The image forming apparatus according to claim 2, wherein the determination by said color determination means regarding color image data is made for each print job.

4. The image forming apparatus according to claim 2, wherein the determination by said color determination means regarding color image data is made for each page.

5. The image forming apparatus according to claim 1, wherein said prescribed time is the warmup time required for the polygon mirrors to reach a steady rate of rotation after their driving is begun.

6. The image forming apparatus according to claim 1, wherein said multiple image forming units have four image forming units, a yellow image forming unit, a magenta image forming unit, a cyan image forming unit and a black image forming unit, and during monochrome image formation, the black image forming unit is used.

7. An image forming apparatus that has multiple image forming units, each of which includes a polygon mirror that reflects the writing light such that the light scans the photoreceptor surface, and that is capable of performing monochrome image formation using one image forming unit and color image formation using multiple image forming units, and comprising:
    a rotation controller that controls the rotation of the polygon mirrors of the image forming units,
    wherein during an image formation session, the rotation controller carries out steady rotation control for the polygon mirrors of the image forming units used for image formation, and
    where a monochrome image formation session is performed after a first color image formation session is completed and a second color image formation session is then performed after the monochrome image formation session is completed,
    if the interval between the completion of the first color image formation session and the commencement of the second color image formation session does not exceed a prescribed period of time, the rotation controller continues steady rotation control for the polygon mirrors of all image forming units used for color image formation during the monochrome image formation session,
    while if the interval between the completion of the first color image formation session and the commencement of the second color image formation session does exceed the prescribed period of time, the rotation controller slows down the polygon mirrors of the image forming units not used for monochrome image formation after the completion of the first color image formation session, and begins steady rotation control for these polygon mirrors once more at least a prescribed period of time before the commencement of the second image formation session.

8. The image forming apparatus according to claim 7, wherein said prescribed time is the warmup time required for the polygon mirrors to reach a steady rate of rotation after their driving is begun.

9. An image forming apparatus that has multiple image forming units, each of which includes a polygon mirror that reflects the writing light such that the light scans the photoreceptor surface, and that is capable of performing monochrome image formation using one image forming unit and color image formation using multiple image forming units, and comprising:
    a rotation controller that controls the rotation of the polygon mirrors of the image forming units,
    wherein during an image formation session, the rotation controller carries out steady rotation control for the polygon mirrors of the image forming units used for image formation, and
    where a monochrome image formation session is performed after a first color image formation session is completed and a second color image formation session is then performed after the monochrome image formation session is completed,
    if the interval between the completion of the first color image formation session and the commencement of the second color image formation session does not exceed a prescribed period of time, the rotation controller continues steady rotation control for the polygon mirrors of all image forming units used for color image formation during the monochrome image formation session,
    while if the interval between the completion of the first color image formation session and the commencement of the second color image formation session does exceed the prescribed period of time, the rotation controller stops the driving of the polygon mirrors of the image forming units not used for monochrome image formation after the completion of the first color image formation session, and begins steady rotation control for these polygon mirrors once more at least a prescribed period of time before the commencement of the second image formation session.

10. The image forming apparatus according to claim 9, wherein said prescribed time is the warmup time required for the polygon mirrors to reach a steady rate of rotation after their driving is begun.

11. An image forming apparatus that has multiple image forming units, each of which includes a polygon mirror that reflects the writing light such that the light scans the photoreceptor surface, and that is capable of performing monochrome image formation using one image forming unit and color image formation using multiple image forming units, and comprising:

a rotation controller that controls the rotation of the polygon mirrors of the image forming units, as well as a rotation history storage unit that stores rotation history information regarding the polygon mirrors of the image forming units used for color image formation but not for monochrome image formation, wherein during an image formation session, the rotation controller carries out steady rotation control for the polygon mirrors of the image forming units used for image formation, and where a monochrome image formation session is performed after a first color image formation session is completed and a second color image formation session is then performed after the completion of the monochrome image formation session, if the interval between the completion of the first color image formation session and the commencement of the second color image formation session does not exceed a prescribed period of time, the rotation controller continues steady rotation control for the polygon mirrors of all image forming units used for color image formation during the monochrome image formation session, while if the interval between the completion of the first color image formation session and the commencement of the second color image formation session does exceed the prescribed period of time, the rotation controller determines, based on the rotation history information stored in the rotation history storage unit, whether or not to slow down or stop the rotation of the polygon mirrors of the image forming units not used for monochrome image formation after the completion of the first color image formation session.

12. The image forming apparatus according to claim 11, wherein said rotation history storage unit store the cumulative number of times that each of the target polygon mirrors was driven in the past, and where the interval between the completion of the first color image formation session and the commencement of the second image formation session exceeds a prescribed period of time, if any of the cumulative numbers of polygon mirror driving sessions stored in the rotation history storage unit exceeds a prescribed number, the rotation controller continues steady rotation control for the target polygon mirrors during monochrome image formation, and if the cumulative numbers of polygon mirror driving sessions stored in the rotation history storage unit do not exceed the prescribed number, the rotation controller slows down or stops the rotation of the target polygon mirrors, and resumes steady rotation control for such polygon mirrors a prescribed period of time prior to the commencement of the second image formation session.

13. The image forming apparatus according to claim 11, wherein said rotation history storage unit store the cumulative rotation duration for each of the target polygon mirrors, and where the interval between the completion of the first color image formation session and the commencement of the second image formation session exceeds a prescribed period of time, if the cumulative rotation durations stored in the rotation history storage unit do not exceed a prescribed threshold value, the rotation controller continues steady rotation control for the target polygon mirrors during the monochrome image formation session, while if any of the cumulative rotation durations stored in the rotation history storage unit does exceed the prescribed threshold value, the rotation controller slows down or stops the target polygon mirrors, and resumes steady rotation control for such polygon mirrors a prescribed period of time prior to the commencement of the second image formation session.

14. A polygon mirror control method used in an image forming apparatus that has multiple image forming units, each of which includes a polygon mirror that reflects the writing light such that the light scans the photoreceptor surface, and that is capable of performing monochrome image formation using one image forming unit and color image formation using multiple image forming units, said method including the steps of:

starting and performing steady rotation control for the polygon mirrors of the image forming units;

determining the image forming units that are necessary for image formation (determination step);

performing, during monochrome image formation, steady rotation control for the polygon mirror of the image forming unit used for monochrome image formation based on the determination results (monochrome driving step);

performing, during color image formation, steady rotation control for the polygon mirrors of all image forming units used for color image formation based on the determination results (color driving step); and performing, when a color image formation session is carried out after a monochrome image formation session is completed, steady rotation control for the polygon mirrors of the image forming units used for color image formation but not for monochrome image formation a prescribed period of time prior to the commencement of image formation by said image forming units.

15. The polygon mirror control method used in an image forming apparatus according to claim 14, wherein said determination step is carried out for each print job of image data.

16. The polygon mirror control method used in an image forming apparatus according to claim 14, wherein said determination step is carried out for each page of image data.

17. The polygon mirror control method used in an image forming apparatus according to claim 14, wherein said determination step is carried out based on the image data provided for image formation at least a prescribed period of time prior to the commencement of writing based on the image data, and where the determination result from the color determination means changes from NO to YES, a color driving step in which steady rotation control is performed for the polygon mirrors of the image forming units used for color image formation but not for monochrome image formation is carried out.

* * * * *